(12) United States Patent
Kimura

(10) Patent No.: US 10,926,978 B2
(45) Date of Patent: Feb. 23, 2021

(54) MAN CONVEYOR APPARATUS AND CONTROLLER FOR MAN CONVEYOR APPARATUS

(71) Applicant: Mitsubishi Electric Corporation, Tokyo (JP)

(72) Inventor: Ippei Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/605,811

(22) PCT Filed: Jun. 8, 2017

(86) PCT No.: PCT/JP2017/021358
§ 371 (c)(1),
(2) Date: Oct. 17, 2019

(87) PCT Pub. No.: WO2018/225223
PCT Pub. Date: Dec. 13, 2018

(65) Prior Publication Data
US 2020/0122979 A1 Apr. 23, 2020

(51) Int. Cl.
*B66B 25/00* (2006.01)
*B66B 21/02* (2006.01)
*B66B 23/12* (2006.01)

(52) U.S. Cl.
CPC ............ *B66B 25/00* (2013.01); *B66B 25/003* (2013.01); *B66B 21/02* (2013.01); *B66B 23/12* (2013.01)

(58) Field of Classification Search
CPC ..... B66B 25/00; B66B 25/003; B66B 25/006; B66B 23/02; B66B 21/02; B66B 23/12; Y02B 50/00
See application file for complete search history.

(56) References Cited

U.S. PATENT DOCUMENTS

| | | | |
|---|---|---|---|
| 4,600,865 A | 7/1986 | Caputo | |
| 4,664,247 A * | 5/1987 | Wolf | ................... H02P 29/0022 198/323 |

(Continued)

FOREIGN PATENT DOCUMENTS

| | | |
|---|---|---|
| CN | 101298308 A | 11/2008 |
| JP | 59-138586 U | 9/1984 |

(Continued)

OTHER PUBLICATIONS

Chinese Office Action dated May 22, 2020, issued in corresponding Chinese Patent Application No. 201780091380.6.
(Continued)

*Primary Examiner* — Mark A Deuble
(74) *Attorney, Agent, or Firm* — Xsensus LLP

(57) ABSTRACT

Provided is a man conveyor apparatus (1), including: steps (17) connected in an endless manner; two or more drive motors (4a and 4b), each being configured to circulate the steps (17); a load detection device (10) configured to detect a load of the drive motors (4a and 4b); and a controller (11) configured to control an operation and stop of each of the drive motors (4a and 4b), wherein the controller (11) increases or decreases the number of the drive motors to be driven in accordance with a value of the load detected by the load detection device (10) and changes a drive motor to be driven as a main motor each time the number of drive motors to be driven is decreased.

6 Claims, 4 Drawing Sheets

(56) References Cited

U.S. PATENT DOCUMENTS

| | | | | |
|---|---|---|---|---|
| 2003/0000801 A1* | 1/2003 | Spannhake | ............ | B66B 25/00 |
| | | | | 198/322 |
| 2006/0027438 A1* | 2/2006 | Fargo | ...................... | B66B 23/02 |
| | | | | 198/330 |
| 2012/0186940 A1* | 7/2012 | Lanzki | .................... | B66B 25/00 |
| | | | | 198/322 |
| 2013/0026001 A1* | 1/2013 | Gonzalez Alemany | ..................... | |
| | | | | B66B 23/026 |
| | | | | 198/322 |
| 2013/0153362 A1* | 6/2013 | Gonzalez Alemany | ..................... | |
| | | | | B65G 23/26 |
| | | | | 198/322 |
| 2013/0300339 A1* | 11/2013 | Boom | .................... | B66B 25/00 |
| | | | | 318/812 |

FOREIGN PATENT DOCUMENTS

| | | |
|---|---|---|
| JP | 59-142278 U | 9/1984 |
| JP | 7-252073 A | 10/1995 |
| JP | 2014-231428 A | 12/2014 |
| JP | 2016-11201 A | 1/2016 |

OTHER PUBLICATIONS

International Search Report and Written Opinion dated Aug. 22, 2017 for PCT/JP2017/021358 filed on Jun. 8, 2017, 6 pages including English Translation of the International Search Report.

* cited by examiner

MAN CONVEYOR APPARATUS AND CONTROLLER FOR MAN CONVEYOR APPARATUS

CROSS-REFERENCE TO RELATED APPLICATION

The present application is based on PCT filing PCT/JP2017/021358, filed Jun. 8, 2017, the entire contents of which are incorporated herein by reference.

TECHNICAL FIELD

The present invention relates to a man conveyor apparatus and a controller for a man conveyor apparatus.

BACKGROUND ART

A man conveyor apparatus includes, for example, an escalator and a moving walkway.

When an escalator is installed in, for example, a high-rise building, a component such as a drive motor is required to be increased in size, or a special component is required to be used. Thus, for example, in a related-art escalator of Patent Literature 1, a drive unit is formed as a plurality of drive units to be provided in a dispersed manner so as to prevent increase in size of each of the drive motors. Specifically, in Patent Literature 1, a plurality of drive units are installed at an intermediate position in the escalator. Further, according to the description in Patent Literature 1, the escalator can be installed even in a high-rise building having a height exceeding 10 meters with use of an increased number of drive units.

Further, for example, in Patent Literature 2, there is disclosed a technology of detecting, in a man conveyor apparatus including a plurality of drive motors, a load of the man conveyor apparatus with use of elastic members, each including strain indicators built therein, to control the number of drive motors to be driven.

CITATION LIST

Patent Literature

[PTL 1] JP 07-252073 A
[PTL 2] JP 59-138586 A

SUMMARY OF INVENTION

Technical Problem

In the related-art escalator described in Patent Literature 1, however, the plurality of drive units are always operated regardless of a value of the load. Thus, there arises a problem in that power is needlessly consumed.

In Patent Literature 2, control is performed so as to drive one drive motor in a light-load state, thereby achieving energy saving. In the control method of Patent Literature 2, however, the one drive motor to be driven in a light-load state is always the same, and another drive motor is to be driven only in an overload state. Hence, the one drive motor and the another drive motor to be driven only in the overload state greatly differ in device lifetime. As a result, there arises a problem in that a replacement frequency varies depending on the device and the replacement frequency increases for the device having a short device lifetime.

The present invention has been made to solve the problems described above, and has an object to provide a man conveyor apparatus and a controller for a man conveyor apparatus, with which an energy-saving operation is performed in a light-load state to achieve reduction of variation in replacement frequency among devices while reducing power consumption.

Solution to Problem

According to one embodiment of the present invention, there is provided a man conveyor apparatus, including: footsteps connected in an endless manner; two or more drive motors, each being configured to circulate the footsteps; a load detection device configured to detect a load of the drive motors; and a controller configured to control an operation and stop of each of the drive motors, wherein the controller increases or decreases the number of the drive motors to be driven in accordance with a value of the load detected by the load detection device and changes a drive motor to be driven as a main motor each time the number of drive motors to be driven is decreased.

Advantageous Effects of Invention

According to the man conveyor apparatus of one embodiment of the present invention, the number of drive motors to be driven is increased or decreased in accordance with the value of the load detected by the load detection device, and the drive motor to be driven as the main motor is changed each time the number of drive motors is decreased. Thus, the energy-saving operation is performed in a light-load state to achieve the reduction of variation in replacement frequency among the devices while reducing the power consumption.

DESCRIPTION OF EMBODIMENTS

First Embodiment

Figure 1:
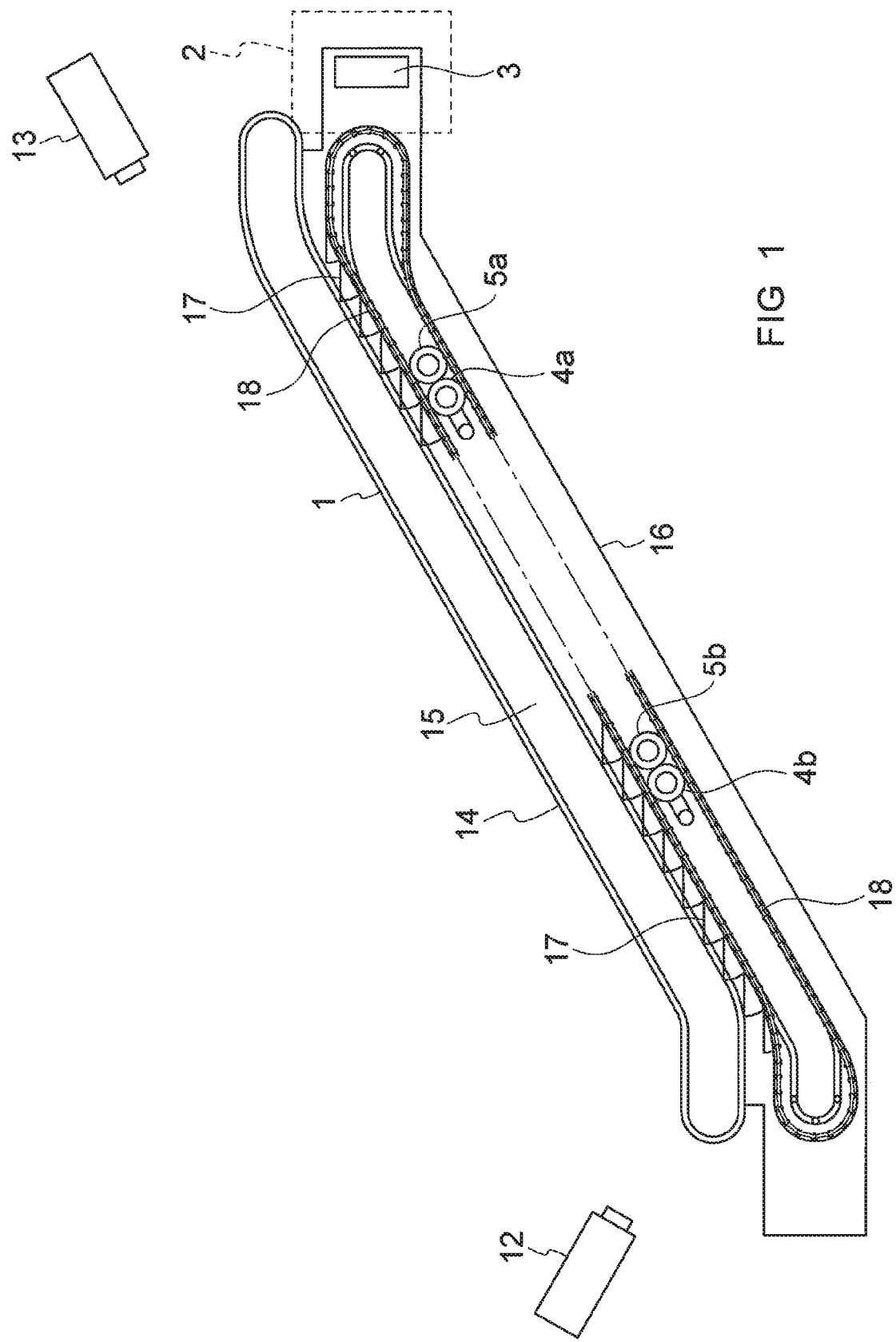
FIG. 1 is a side view for illustrating a configuration of a man conveyor apparatus according to a first embodiment of the present invention.

FIG. 1 is a side view for illustrating an overall configuration of a man conveyor apparatus. A man conveyor apparatus 1 transports a passenger through circulation of footsteps connected in an endless manner. In the following description, the footsteps are referred to as "steps" 17. As illustrated in FIG. 1, in the man conveyor apparatus 1, a step chain 18 formed in an endless manner is installed inside a truss structure 16. A plurality of steps 17 are mounted to the step chain 18. The step chain 18 is formed of, for example, a toothed chain.

Inside the truss structure 16, a plurality of drive motors 4a and 4b are installed. The drive motors 4a and 4b rotate in mesh with teeth of the step chain 18 to thereby circulate the step chain 18. Along with the circulation of the step chain 18, each of the steps 17 circulates along a path inside the truss structure 16. For the drive motor 4a, a brake device 5a configured to stop drive of the drive motor 4a is provided. For the drive motor 4b, a brake device 5b configured to stop drive of the drive motor 4b is provided.

In the first embodiment, a case in which two drive motors are installed is described. However, the number of drive motors is not limited thereto, and three or more drive motors may be provided. Further, even when the number of drive motors is three or more, for example, the man conveyor apparatus and a control panel 3 operate basically in the same manner. Therefore, in the first embodiment, the case in which two drive motors are provided is mainly described as an example.

In the man conveyor apparatus 1, side panels 15 and rubber handrails 14 are provided above the truss structure 16. The side panels 15 and the rubber handrails 14 are provided along both ends of the steps 17 in a width direction thereof. The width direction of the steps 17 corresponds to a direction perpendicular to a traveling direction of the steps 17 on a horizontal face for forming a step tread face of each of the steps 17 on which a passenger stands. When using the man conveyor apparatus 1, a passenger stands on the step tread face of one of the steps 17 and is conveyed in the traveling direction of the steps 17 while holding the rubber handrail 14.

In an upper part of the man conveyor apparatus 1, a machine room 2 is provided. Inside the machine room 2, the control panel 3 is provided. The control panel 3 is configured to perform control for supplying power to the drive motors 4a and 4b and the brake devices 5a and 5b.

Figure 2:
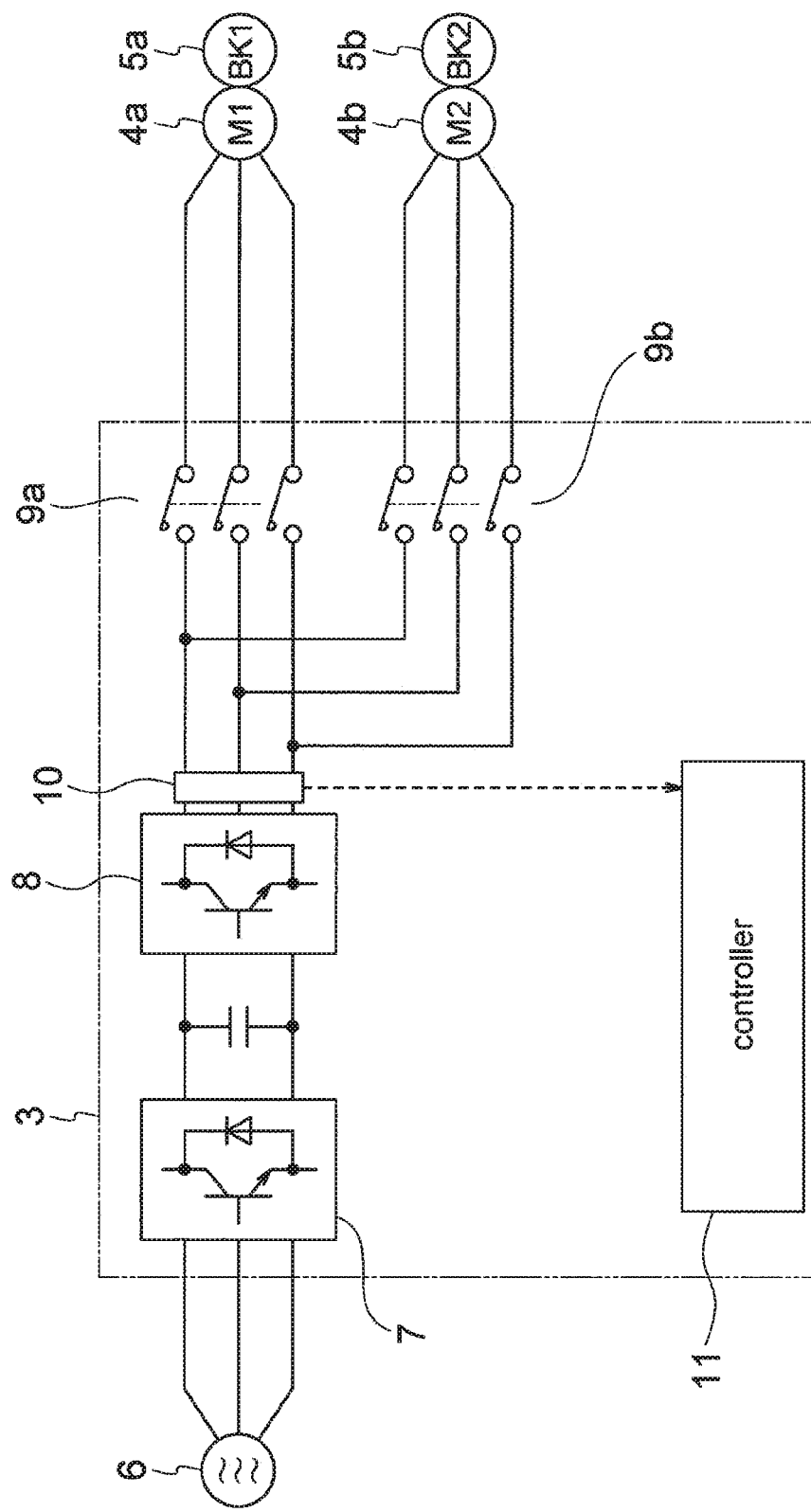
FIG. 2 is a block diagram for illustrating a configuration of a control panel installed in the man conveyor apparatus according to the first embodiment of the present invention.

FIG. 2 is a block diagram for illustrating an internal configuration of the control panel 3. As illustrated in FIG. 2, the control panel 3 is connected to an AC power supply 6. The AC power supply 6 is formed of, for example, a commercial power supply.

As illustrated in FIG. 2, the control panel 3 includes a converter 7, an inverter 8, electromagnetic contactors 9a and 9b, a current detection device 10, and a controller 11.

The converter 7 is configured to convert an AC voltage from the AC power supply 6 into a DC voltage for the driving of the drive motors 4a and 4b.

The inverter 8 is connected to the converter 7. The inverter 8 is configured to perform processing of converting again the direct current output from the converter 7 into the alternating current, to thereby convert a frequency and a voltage into a desired frequency and a desired voltage.

In FIG. 2, a capacitor is provided between the inverter 8 and the converter 7. It is not always required that the capacitor be installed. However, the capacitor is typically installed. The capacitor is provided to, for example, smooth the DC voltage obtained through the conversion performed by the converter 7, follow a sudden acceleration performed by the drive motors 4a and 4b connected to the inverter 8, and compensate for an output of the inverter 8 in case of a short interruption of an output from the converter 7.

The current detection device 10 is configured to detect a current value of a current flowing though the drive motors 4a and 4b and output a current detection value to the controller 11. The current detection value detected by the current detection device 10 increases or decreases in accordance with a load of the drive motor 4a and the drive motor 4b. More specifically, when the load of the drive motor 4a and the drive motor 4b increases, the current detection value is increased. When the load of the drive motor 4a and the drive motor 4b decreases, the current detection value is decreased. Therefore, the current detection device 10 serves as a load detection unit configured to detect the load of the drive motor 4a and the drive motor 4b. The load of the drive motor 4a and the drive motor 4b is indicative of a load of the man conveyor apparatus 1, specifically, is indicative of a total weight of, for example, a passenger on the man conveyor apparatus 1 and his/her baggage.

The controller 11 performs ON/OFF control for the electromagnetic contactors 9a and 9b based on a current detection value output from the current detection device 10.

The electromagnetic contactor 9a is connected to the drive motor 4a and the brake device 5a. When the electromagnetic contactor 9a is in an ON state, power is supplied to the drive motor 4a or the brake device 5a from the control panel 3. Meanwhile, when the electromagnetic contractor 9a is in an OFF state, power is not supplied to the drive motor 4a or the brake device 5a from the control panel 3.

Similarly, the electromagnetic contactor 9b is connected to the drive motor 4b and the brake device 5b. When the electromagnetic contactor 9b is in an ON state, power is supplied to the drive motor 4b or the brake device 5b from the control panel 3. Meanwhile, when the electromagnetic contractor 9b is in an OFF state, power is not supplied to the drive motor 4b or the brake device 5b from the control panel 3.

The control panel 3 has the configuration described above, and performs the ON/OFF control for the electromagnetic contactors 9a and 9b in accordance with a current detection value output from the current detection device 10, to thereby perform switching between drive and stop of each of the drive motors 4a and 4b and between drive and stop of each of the brake devices 5a and 5b.

Figure 3:
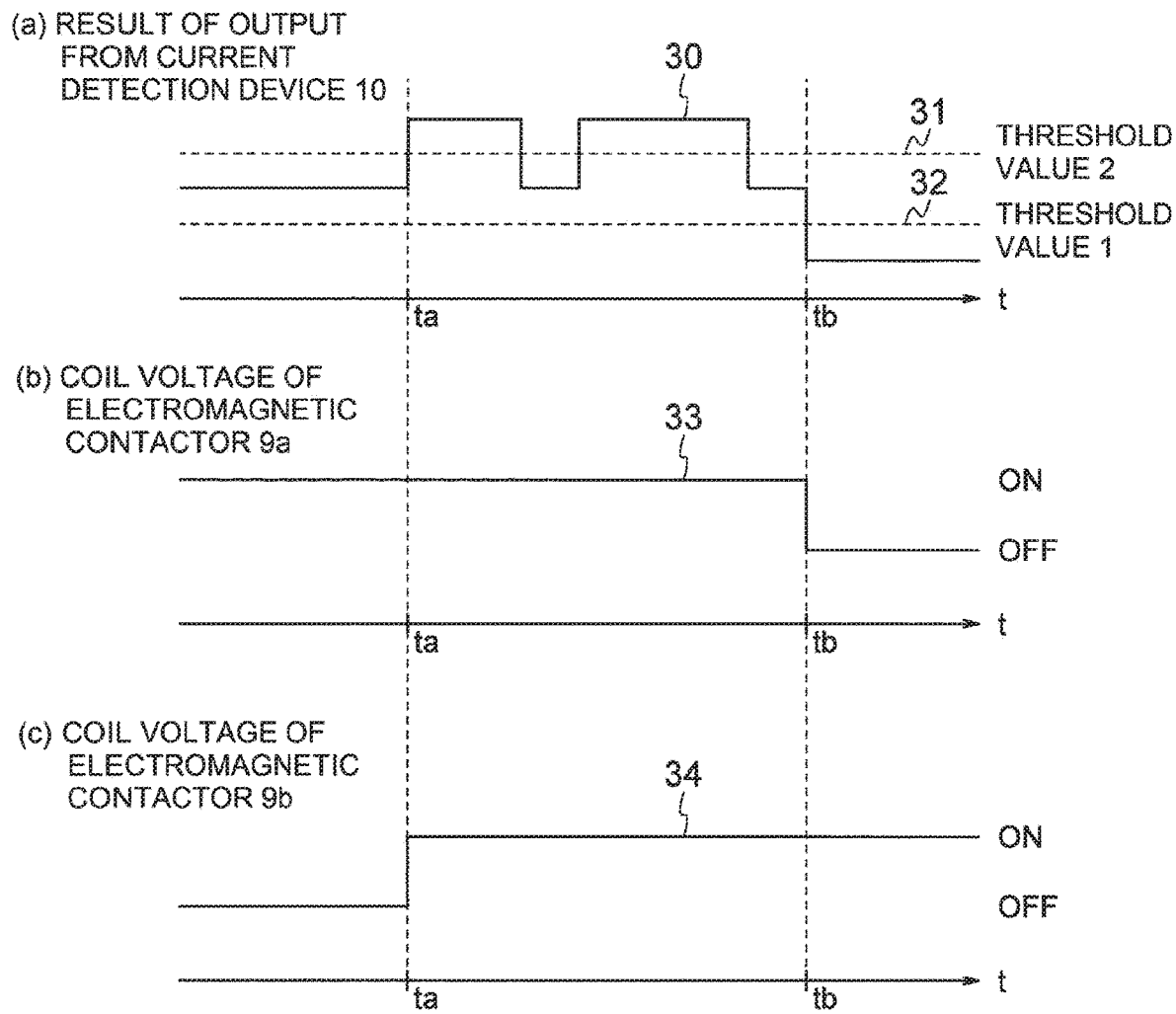
FIG. 3 is a timing chart for illustrating an example of an operation pattern of the man conveyor apparatus according to the first embodiment of the present invention.
Figure 4:
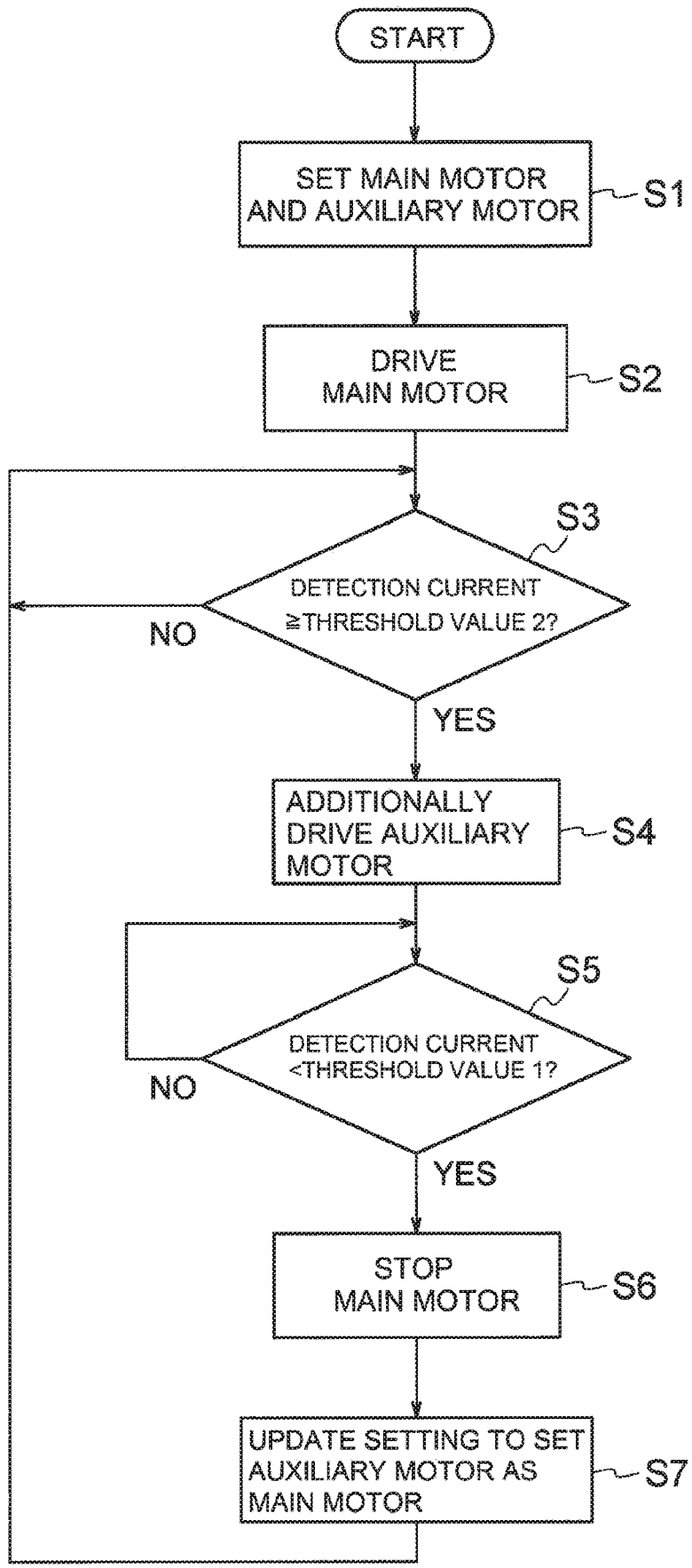
FIG. 4 is a flowchart for illustrating a flow of processing performed by a controller for the man conveyor apparatus according to the first embodiment of the present invention.

Next, with reference to FIG. 3 and FIG. 4, an operation of the controller 11 included in the control panel 3 is described.

FIG. 3 is a timing chart for illustrating an example of operation patterns of the current detection device 10 and the electromagnetic contactors 9a and 9b along with increase and decrease in the number of passengers. FIG. 4 is a flowchart for illustrating a flow of processing performed by the controller 11.

In Part (a) of FIG. 3, the horizontal axis represents time. The vertical axis represents a current detection value 30 of the current detection device 10. In this case, a value obtained through analog/digital conversion (AD conversion) of the output of the current detection device 10 is used as the current detection value 30. In Part (a) of FIG. 3, a threshold value 1 is indicated by a dotted line 32, and a threshold value 2 is indicated by a dotted line 31. The threshold value 1 is a current threshold value to be used for determination of whether or not to decrease the number of drive motors to be driven, and the threshold value 2 is a current threshold value to be used for determination of whether or not to increase the number of drive motors to be driven. The threshold value 1 and the threshold value 2 are set to values different from each other, and the threshold value 2 is set to a value larger than the threshold value 1. The threshold value 2 is set to, for example, a current value corresponding to a case in which the load is 80% of a rated load for one drive motor. The threshold value 1 is set to, for example, a current value corresponding to a case in which the load is 30% of the rated load for one drive motor. However, the threshold value 1 and the threshold value 2 are not limited to those of the examples described above, and may be appropriately set to suitable values. The threshold value 1 and the threshold value 2 are stored in advance in a storage unit (not shown) of the controller 11.

In Part (b) of FIG. 3, the horizontal axis represents time. The vertical axis represents a waveform 33 of a coil voltage of the electromagnetic contactor 9a. Specifically, the vertical axis of Part (b) indicates the ON/OFF state of the electromagnetic contactor 9a. Similarly, in Part (c) of FIG. 3, the horizontal axis represents time. The vertical axis represents a waveform 34 of a coil voltage of the electromagnetic contactor 9b. Specifically, the vertical axis of Part (c) indicates the ON/OFF state of the electromagnetic contactor 9b.

With reference to the example of the operation patterns of FIG. 3, an outline of the operation of the controller 11 is described. In FIG. 3, when time t falls within a range of t<ta, the current detection value 30 of the current detection device 10 is smaller than the threshold value 2. Thus, the controller 11 determines that only one drive motor, specifically, only the drive motor 4a is required to be driven, and then turns on the electromagnetic contactor 9a to operate only the drive motor 4a. At this time, the drive motor 4a is set as a main motor, whereas the drive motor 4b is set as an auxiliary motor.

Next, when the time t falls within a range of ta≤t<tb, first, at a time point with the time t satisfying t=ta, the current detection value 30 of the current detection device 10 is equal to or larger than the threshold value 2. Thus, the controller 11 determines that the number of drive motors to be driven is required to be increased, and then additionally turns on the electromagnetic contactor 9b to start the operation of the drive motor 4b. As a result, both the drive motors 4a and 4b are driven. Even thereafter, the current detection value 30 of the current detection device 10 does not become smaller than the threshold value 1, and thus the controller 11 continues driving both of the drive motors 4a and 4b.

Next, when the time t falls within a range of tb≤t, first, at a time point with the time t satisfying t=tb, the current detection value 30 of the current detection device 10 becomes smaller than the threshold value 1. Thus, the controller 11 determines that the number of drive motors to be driven is required to be decreased. Hence, the controller 11 stops the operation of the drive motor 4a, which is the main motor, and continues the operation of only the drive motor 4b. Further, the controller 11 updates setting of the main motor and the auxiliary motor to set the drive motor 4b as the main motor and the drive motor 4a as the auxiliary motor.

As described above, the controller 11 changes the drive motor to be set as the maim motor between the two drive motors 4a and 4b. As a result, a frequency of opening and closing the electromagnetic contactor 9a and that of the electromagnetic contactor 9b can be set approximately equal to each other.

Next, with reference to the flowchart of FIG. 4, the flow of the processing performed by the controller 11 is described. First, in Step S1, the controller 11 performs the setting of the main motor and the auxiliary motor. The following description is made based on the assumption that, for example, the drive motor 4a is set as the main motor and the drive motor 4b is set as the auxiliary motor.

Next, in Step S2, the controller 11 turns on the electromagnetic contactor 9a to drive the drive motor 4a, which is the main motor.

Next, in Step S3, the controller 11 monitors the current detection value 30 of the current detection device 10 and compares the current detection value 30 and the threshold value 2 with each other. The controller 11 repeats the comparison processing in Step S3 at a constant cycle until the current detection value 30 becomes equal to or larger than the threshold value 2. After the current detection value 30 becomes equal to or larger than the threshold value 2, the processing proceeds to Step S4.

In Step S4, the controller 11 determines that the number of drive motors to be driven is required to be increased based on the result of comparison in Step S3, and turns on the electromagnetic contactor 9b to drive the drive motor 4b. As a result, both of the drive motors 4a and 4b are operated.

Next, in Step S5, the controller 11 monitors the current detection value 30 of the current detection device 10 and compares the current detection value 30 and the threshold value 1 with each other. The controller 11 repeats the comparison processing in Step S5 at a constant cycle until the current detection value 30 becomes smaller than the threshold value 1. After the current detection value 30 becomes smaller than the threshold value 1, the processing proceeds to Step S6.

In Step S6, the controller 11 determines that the number of drive motors to be driven is required to be decreased based on the result of comparison in Step S5, and turns off the electromagnetic contactor 9a to stop drive of the drive motor 4a, which is the main motor. As a result, only the drive motor 4b is operated.

Next, in Step S7, the controller 11 updates the setting of the main motor and the auxiliary motor. In the update, the controller 11 interchanges the main motor and the auxiliary motor. Specifically, in Step S1 described above, the drive motor 4a is set as the main motor and the drive motor 4b is set as the auxiliary motor. Thus, in Step S7, the main motor and the auxiliary motor are interchanged so that the drive motor 4b is set as the main motor and the drive motor 4a is set as the auxiliary motor. Then, the processing returns to Step S3 to repeat the processing from Step S3 to Step S7.

As described above, in the first embodiment, in the man conveyor apparatus 1, the controller 11 detects the current flowing through the drive motors 4a and 4b with use of the current detection device 10 and controls the electromagnetic contactors 9a and 9b to thereby drive the number of drive motors 4a and/or 4b in accordance with the current detection value 30. For example, in a normal operation, the man conveyor apparatus 1 is driven by only one drive motor 4a. When the current flowing through the drive motor 4a becomes equal to or larger than the threshold value 2 along with increase in the number of passengers, the controller 11 controls the electromagnetic contactor 9b to apply a voltage to another drive motor 9b, which is not currently driven. In this manner, the man conveyor apparatus 1 is driven by two drive motors 4a and 4b.

When the number of passengers decreases and hence the current flowing through the drive motors 4a and 4b is decreased, the number of drive motors to be driven is decreased. At this time, the operation of the drive motor 4b, which is driven subsequent to the drive motor 4a, is continued, whereas the drive motor 4a, which is first driven, is stopped. In this manner, the number of times of opening and closing of the electromagnetic contactor 9a configured to drive the drive motor 4a and the number of times of opening and closing of the electromagnetic contactor 9b configured to drive the drive motor 4b are set equal to each other to reduce replacement frequencies of the drive motors 4a and 4b and the electromagnetic contactors 9a and 9b.

In the first embodiment, the threshold value 1 and the threshold value 2 are set to the different values instead of being set to the same value. More specifically, the threshold value 1 and the threshold value 2 are set so that the threshold value 2 is larger than the threshold value 1. With the setting of the threshold value 1 to the value smaller than the threshold value 2 as described above, even when the number of passengers increases immediately after the number of drive motors is decreased, immediate increase of the number of drive motors can be prevented. As a result, the electromagnetic contactors 9a and 9b are not frequently opened and closed.

In the man conveyor apparatus 1 according to the first embodiment, in a light-load state, the number of drive motors is decreased so as to perform an energy-saving operation to thereby achieve reduction of power consumption. Further, the drive motor to be driven as the main motor is changed between the drive motors. In this manner, the frequencies of opening and closing the electromagnetic contactors are controlled to be equal to each other. As a result, the replacement frequencies of the electromagnetic contactors 9a and 9b and the drive motors 4a and 4b can be reduced.

In the description given above, the number of drive motors is two. The same description applies even when the number of drive motors is three or more. In this case, however, the order of setting of the drive motors as the main motor is determined in advance. In accordance with the order, the drive motors are sequentially set as the main motor. In this manner, first, the man conveyor apparatus 1 is driven by only one drive motor set as the main motor. When the current flowing through the drive motor becomes equal to or larger than the threshold value 2 along with increase in the number of passengers, the electromagnetic contactor is controlled to additionally apply the voltage to another one of the drive motors, which is not currently driven, so that the man conveyor apparatus 1 is driven by two drive motors. Further, when the number of passengers is further increased and the current becomes equal to or larger than a threshold value 3, the electromagnetic contactor is controlled to additionally apply the voltage to another one of the drive motors, which is not currently driven, so that the man conveyor apparatus 1 is driven by three drive motors. The above-mentioned operation is repeated. As described above, three or more threshold values are set in advance in accordance with the number of drive motors. Through comparison with the threshold values described above, the number of drive motors is sequentially increased. When the number of passengers decreases and the current flowing through the drive motors is decreased, the number of drive motors to be driven is decreased one by one. Specifically, in the same manner described above, three or more threshold values are set in advance in accordance with the number of drive motors. Through comparison with the threshold values described above, the number of drive motors is sequentially decreased. In this case, the operation of the drive motor set as the main motor is stopped, while the operations of the other drive motors are continued. Then, the drive motor, which is set as the second one to be set as the main motor, is set as the main motor. In this manner, the number of times of opening and closing can be set equal for the electromagnetic contactors respectively configured to drive the drive motors. Thus, the replacement frequencies of the drive motors and the electromagnetic contactors can be made equal to each other.

In the description given above, when the number of drive motors to be driven is increased or decreased, the number of drive motors is increased or decreased by one for each time. However, the number of drive motors to be increased or decreased for each time is not limited to the above-mentioned number. For example, the number of drive motors may be increased or decreased by a preset number for each time, for example, by two for each time.

Second Embodiment

In the first embodiment described above, there has been described the example in which the current detection device 10 is used as the load detection unit configured to detect the load of the man conveyor apparatus 1. However, a device other than the current detection device 10 may be used as the load detection unit. The use of a device other than the current detection device 10 is described below.

In the second embodiment, as illustrated in FIG. 1, cameras 12 and 13 configured to photograph an entrance and an exit of the man conveyor apparatus 1 are provided as the load detection units. The cameras 12 and 13 may be installed for both of the entrance and the exit of the man conveyor apparatus 1. However, any one of the cameras may be installed only for the entrance.

Now, it is assumed that the camera 12 is installed for the entrance of the man conveyor apparatus 1. The entrance is photographed by the camera 12 so that image data obtained by the photographing is subjected to image processing. As a result, the number of passengers, who have passed through the entrance, can be counted. Through detection of the number of passengers in the above-mentioned manner at preset time intervals, the number of passengers on the man conveyor apparatus 1 can be detected. In this manner, a boarding rate of passengers on the man conveyor apparatus 1 is calculated from the number of passengers. Based on the result of calculation, the number of drive motors to be driven can be determined.

In the second embodiment, the threshold value 1 and the threshold value 2 are preset for the boarding rate of passengers on the man conveyor apparatus 1. Then, in Step S3 of the flowchart of FIG. 4, the controller 11 determines whether or not the boarding rate is equal to or larger than the threshold value 2 with use of the boarding rate of passengers on the man conveyor apparatus 1 in place of the detected current value. Similarly, in Step S5 of the flowchart of FIG. 4, the controller 11 determines whether or not the boarding rate is smaller than the threshold value 1 with use of the boarding rate of passengers on the man conveyor apparatus 1 in place of the detected current value.

In the second embodiment, other configurations and operations are the same as those in the first embodiment. Thus, the description thereof is herein omitted.

Further, when the camera 12 is installed for the entrance of the man conveyor apparatus 1 and the camera 13 is installed for the exit of the man conveyor apparatus 1, accuracy of detection of the load can be further enhanced. Specifically, the entrance is photographed by the camera 12, whereas the exit is photographed by the camera 13. In this manner, the number of passengers, who have passed through the entrance, can be counted based on image data obtained by the camera 12, and the number of passengers, who have passed through the exit, can be counted based on image data obtained by the camera 13. As described above, at preset time intervals, the number of passengers, who have passed through the exit, is subtracted from the number of passengers, who have passed through the entrance. As a result, the number of passengers on the man conveyor apparatus 1 can be detected with higher accuracy.

Sensors such as infrared sensors may be used in place of the cameras 12 and 13 so as to photograph the entrance and the exit to detect the number of passengers. In this manner, the boarding rate of passengers on the man conveyor apparatus 1 may be detected.

Further, as described in Patent Literature 2, elastic members, each including strain sensors built therein, may be installed between the truss structure 16 and floors of a building so as to detect the boarding rate of passengers on the man conveyor apparatus 1 from strain amounts detected by the strain sensors.

Alternatively, photoelectric sensors, each including a light-emitting device configured to emit light and a light-receiving device configured to receive the light, may be provided to the entrance and the exit of the man conveyor apparatus 1 in place of the cameras 12 and 13. In the normal operation, the light emitted from the light-emitting device is received by the light-receiving device. Meanwhile, when a passenger passes through the entrance or the exit, the light emitted from the light-emitting device is interrupted by the passenger. Thus, the light cannot be received by the light-receiving device. Accordingly, when the light is not received by the light-receiving device for a preset period of time, it is determined that the passenger has passed through the entrance and the exit. As described above, the number of passengers currently on the man conveyor apparatus 1 can be detected from the number of passengers, who have passed through the entrance and the exit, at the preset time intervals. As a result, the boarding rate of passengers on the man conveyor apparatus 1 can be detected.

Further, the number of drive motors to be driven may be determined based on the number of passengers in place of the boarding rate of passengers on the man conveyor apparatus 1. In this case, the threshold value 1 and the threshold value 2 may be set for the number of passengers.

As described above, even in the second embodiment as in the first embodiment, in a light-load state, the number of drive motors is decreased to perform the energy-saving operation. In this manner, the reduction in power consumption is achieved. Further, the drive motor to be driven as the main motor is set alternately between the two drive motors to perform control so that the frequencies of opening and closing the electromagnetic contactors become equal to each other. In this manner, the replacement frequencies of the electromagnetic contactors 9a and 9b and the drive motors 4a and 4b can be reduced.

In the first embodiment and the second embodiment described above, the controller 11 includes a processor and a memory, and each of the above-mentioned functions of the controller 11 can be achieved through execution of the program stored in the memory with use of the processor. Alternatively, the controller 11 may be formed of dedicated hardware, for example, a single circuit, a composite circuit, or a programmed processor.

INDUSTRIAL APPLICABILITY

In the first embodiment and the second embodiment described above, the escalator has been described as an example of the man conveyor apparatus. However, the man conveyor apparatus and the controller therefor according to each of the first embodiment and the second embodiment are applicable to other man conveyor apparatus such as a moving walkway. Further, a plurality of drive motors are provided. Thus, the man conveyor apparatus and the controller therefor according to each of the first embodiment and the second embodiment are effective not only for a general escalator but also for a high-rise escalator and a moving walkway for a long traveling distance.

REFERENCE SIGNS LIST 1 man conveyor apparatus, 2 machine room, 3 control panel, 4a, 4b drive motor, 5a, 5b brake device, 6 AC power supply, 7 converter, 8 inverter, 9a, 9b electromagnetic contactor, 10 current detection device, 11 controller

The invention claimed is:

1. A man conveyor apparatus, comprising:
   footsteps connected in an endless manner;
   two or more drive motors, each being configured to circulate the footsteps;
   a load detector configured to detect a load of the drive motors; and
   a controller configured to control an operation and stop of each of the drive motors,
   wherein the controller increases or decreases the number of the drive motors to be driven in accordance with a value of the load detected by the load detector and changes a drive motor to be driven as a main motor each time the number of drive motors to be driven is decreased.

2. The man conveyor apparatus according to claim 1, wherein the controller includes:
   a memory to store a first threshold value and a second threshold value;
   first determination circuitry configured to compare the value of the load detected by the load detector and the second threshold value with each other, increase the number of drive motors to be driven by a preset number when the value of the load is equal to or larger than the second threshold value, and output the increased number as the number of drive motors to be driven;
   second determination circuitry configured to compare the value of the load detected by the load detector and the first threshold value with each other, decrease the number of drive motors to be driven by a preset number when the value of the load is smaller than the first threshold value, and output the decreased number as the number of drive motors to be driven; and
   a regulator configured to control the operation and the stop of each of the drive motors in accordance with the number of drive motors, which is output from the first determination circuitry and the second determination circuitry.

3. The man conveyor apparatus according to claim 2, wherein the second threshold value is larger than the first threshold value.

4. A controller for a man conveyor apparatus, which is configured to control an operation and stop of each of two or more drive motors of the man conveyor apparatus configured to circulate footsteps connected in an endless manner to transport a passenger, the controller being configured to increase or decrease a number of drive motors to be driven in accordance with a value of a load of the drive motors, which is detected by a load detector configured to detect the load of the drive motors and change a drive motor to be driven as a main motor each time the number of drive motors to be driven is decreased.

5. The controller for a man conveyor apparatus according to claim 4, the controller comprising:
   a memory configured to store in advance a first threshold value and a second threshold value;
   first determination circuitry configured to compare the value of the load detected by the load detector and the second threshold value with each other, increase the number of drive motors to be driven by a preset number when the value of the load is equal to or larger than the second threshold value, and output the increased number as the number of drive motors to be driven;
   second determination circuitry configured to compare the value of the load detected by the load detector and the first threshold value with each other, decrease the number of drive motors to be driven by the preset number when the value of the load is smaller than the first threshold value, and output the decreased number as the number of drive motors to be driven; and
   a regulator configured to control the operation and the stop of each of the drive motors in accordance with the number of drive motors, which is output from the first determination circuitry and the second determination circuitry.

6. The controller for a man conveyor apparatus according to claim 5, wherein the second threshold value is set larger than the first threshold value.

* * * * *